United States Patent [19]

Kauffman et al.

[11] Patent Number: 5,498,224
[45] Date of Patent: Mar. 12, 1996

[54] STARCH BASED HOT MELT ADHESIVES FOR CIGARETTES

[75] Inventors: Thomas F. Kauffman, Easton, Pa.; Joseph Wieczorek, Jr., Flemington; Stephen F. Hatfield, Somerville, both of N.J.

[73] Assignee: National Starch and Chemical Investment Holding Corporation, Wilmington, Del.

[21] Appl. No.: 277,829

[22] Filed: Jul. 20, 1994

[51] Int. Cl.$^6$ ................................................ A24C 5/46
[52] U.S. Cl. .................... 493/39; 131/77; 131/84.1
[58] Field of Search .................... 131/77, 84.1; 493/39

[56] References Cited

U.S. PATENT DOCUMENTS 5,058,607  10/1991  Carter et al. ........................ 131/58
5,360,845  11/1994  Billmers et al. ...................... 524/51

*Primary Examiner*—Jeffrey Mullis
*Attorney, Agent, or Firm*—Ellen T. Dec

[57] ABSTRACT

In a process for manufacturing degradable cigarette filters wherein adhesive is applied to at least one longitudinal edge of the plug wrap paper, a bond is made while the adhesive is molten and the resultant bond is held in compression for sufficient time to prevent bond movement, the improvement which comprises, using as the adhesive, from about 20 to 60% by weight of an intermediate or high DS starch ester having from about 2 to 18 carbon atoms in the ester component and a DS (degree of substitution) of from about 0.3 to 2.5, 5 to 40% by weight of a polar wax, 5 to 50% by weight of a plasticizing diluent, 0 to 25% by weight of a compatible tackifier and 0 to 3% by weight of an antioxidant.

9 Claims, No Drawings

STARCH BASED HOT MELT ADHESIVES FOR CIGARETTES

BACKGROUND OF THE INVENTION

The present invention is directed to the use of starch based water sensitive hot melt adhesives for bonding the paper which wraps the filter element of a cigarette and to cigarette filter elements bonded therewith.

A standard filter tipped cigarette is produced by three different operations: (1) filter or plug manufacture, (2) rod manufacture and (3) tipping.

The cigarette rod consists of a stream of tobacco wrapped in a paper tube, the paper tube being glued along one longitudinal edge with a suitable adhesive. This operation takes place at speeds varying from 2,000 to 16,000 cigarettes per minute. The weight of the cigarette rod, diameter, and length are all closely monitored for both cost control and tax reasons.

The filter making operation is similar in many respects to the rod manufacture, but the materials and manufacturing equipment used are different. Tobacco smoke filters are most commonly manufactured from a crimped textile tow of cellulose acetate fibers. The tow is then warmed and rolled to produce a material about 9" wide, and containing an even distribution of fibers. The tow is "bloomed" in a known manner to separate the fibers, and a high boiling solvent, commonly called a "plasticizer", is applied by spraying, wicking, or other suitable means. The treated tow is then pulled into a cylindrical form and wrapped with paper. During an interval of time, which can be accelerated by heating, the plasticizer first partially dissolves the surface of the fibers causing them to become sticky and to bond together at points of contact with each other. The plasticizer then migrates into the fiber leaving the surface dry, but the fibers still remain bonded.

The bloomed tow is then formed into a tube, and wrapped in paper or plugwrap, the paper being glued along one longitudinal edge. Because of the nature of the tow, there is a high degree of radial stress upon the glued bond, so any adhesive used, must be able to stick almost instantly, and hold during storage and use. This has led to the use of hot melt type adhesives, which by formulation are fast setting, and allow very high machine speeds to be used.

Currently polyethylene and ethylene vinyl acetate based hot melt adhesive are used for this filter or plugwrap application. These are preferred since they are relatively non-polar and resist the deteriorous effects of triacetin, the latter being the most commonly used plasticizer which often migrates acting as a solvent for the adhesive causing bond deterioration.

Growing environmental concerns have led to the desire on the part of cigarette manufacturers to develop cigarette filters which will degrade when exposed to moisture. Such use requires a hot melt adhesive which will lose strength in water as when flushed or discarded into the environment. The polar nature of such water sensitive hot melt adhesives generally precludes the use of triacetin plasticizers and the cigarette companies, seeking an environmentally friendlier cigarette, are eliminating triacetin in favor of less desirable plasticizers or other filter materials which do not require plasticizers.

SUMMARY OF THE INVENTION

We have now found that satisfactory water sensitive hot melt adhesives for cigarette filter construction can be prepared from about 20 to 60% by weight of an intermediate or high DS starch ester having from about 2 to 18 carbon atoms in the ester component and a DS (degree of substitution) of from about 0.3 to 2.5, 5 to 40% by weight of a polar wax, 5 to 50% by weight of a plasticizing diluent, 0 to 25% by weight of a tackifier and 0 to 3% by weight of an antioxidant.

Adhesives of this type are disclosed in copending application Ser. No. 07/995,493, filed Dec. 23, 1992, now abandoned.

These adhesives, while sufficiently polar in nature to be water sensitive and release when exposed to water provide, nonetheless sufficient fast-setting as well as acceptable taste and odor properties to be used in commercial cigarette filter applications. Moreover, the adhesive has a suitable viscosity while in the molten state, but has very good adhesion to cigarette plug wrap papers and to tobacco smoke filter elements.

The adhesive may be applied to the plug wrap paper by any convenient method, for example, using a heated nozzle, or by direct application via a narrow wheel or roller. The application may be carried out on any type of cigarette plug making machine currently in use. The plug wrap bond is made while the adhesive is molten and held in compression until sufficient bond strength has developed to prevent bond movement. Typical application temperatures of the adhesive are 135 to 175° C., at which point the viscosity will be suitable for good flow and low bleed through.

The tobacco smoke filter element disclosed herein may therefore be comprised of filamentary tow selected from filaments of cellulose acetate, poly(ethylene terephthalate), polypropylene and polyethylene, and/or biodegradable filter tow materials the filaments being bonded together into a filter element and the element then wrapped in plugwrap, at least one longitudinal edge thereof coated with the previously described hot melt adhesive.

DETAILED DESCRIPTION OF THE PREFERRED EMBODIMENTS

The main or primary constituent of the hot melt adhesive composition used herein is a modified starch ester. The modified starch which can be used is an esterified starch compound having the formula:

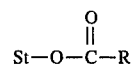

where St represents the starch base material and R is an alkyl, aryl, alkenyl, alkaryl or aralkyl of 1 to 17, preferably 1 to 6 carbon atoms. More preferably, the ester compound will contain an R group which is an alkyl of 1 to 2 carbon atoms. Starch esters of this type include starch acetate, starch propionate, starch butyrate, starch hexanoate, starch stearate, starch oleate, starch benzoate, blends of two more of these esters, for example starch acetate/starch propionate and mixed starch esters where the starch contains two or more different ester substituents, e.g., starch acetate/propionate, i.e., the ester having the formula such as:

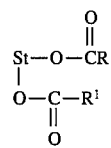

where R and $R^1$ represent different substituent groups as defined above.

Additionally, the modified starch ester will have a DS (degree of substitution) of from about 0.3 to 3.0, preferably from about 0.7 to 2.4, and more preferably from about 0.8 to 1.5. The term "degree of substitution" (DS) as used herein indicates the average number of sites per anhydroglucose unit of the starch molecule on which there are substituent groups.

The starch esters are prepared from the respective carboxylic acid anhydride or acid chlorides. Typical methods include reactions in aqueous systems as disclosed in U.S. Pat. No. 2,461,139 issued Feb. 8, 1949 to C. Caldwell and in solvent systems such as pyridine. These and other methods are disclosed in "Modified Starches: Properties and Uses", edited by O. B. Wurzburg, Chapter 4, pp. 55–77, 1986 and "Starch: Chemistry and Technology", edited by R. L. Whistler, et al., Chapter X, pp. 332–343, 1984 as well as in copending application Ser. No. 07/995,493, filed Dec. 23, 1992.

The base starch material used in the modified starch esters may be any of several starches, native, converted or derivatized. Such starches include those derived from any plant source including corn, potato, wheat, rice, sago, tapioca, waxy maize, sorghum and high amylose starch such as high amylose corn, i.e., starch having at least 45% and more particularly at least 65% amylose content by weight, etc. Starch flours may also be used. Also included are the conversion products derived from any of the former bases, such as, for example, dextrins prepared by hydrolytic action of acid and/or heat; fluidity or thin boiling starches prepared by enzyme conversions or mild acid hydrolysis; oxidized starches prepared by treatment with oxidants such as sodium hypochlorite; and derivatized starches, such as, cationic, anionic, amphoteric, non-ionic, and crosslinked. While any of these starches may be used, the high amylose starches and particularly those having amylose content of at least 65% by weight are preferred. Although the full molecular weight or unhydrolyzed starches can be used as the base material, particularly useful are those starches which have been hydrolyzed but not severely degraded. Such starches have a dextrose equivalent (DE) of less than about 10 and preferably less than about 5. Dextrose equivalent (DE) is defined as the reducing power of the hydrolyzate. Each starch molecule has one reducing end, therefore DE is inversely related to molecular weight. The DE of anhydrous D-glucose is defined as 100 and the DE of unhydrolyzed starch is virtually zero.

In addition to the ester component, a plasticizing diluent is present in the hot melt adhesive formulation. Suitable as plasticizing diluents are non-volatile organic materials which are compatible with the modified starch ester and will be present in sufficient amount to allow the formulation to function as a hot melt by melting and forming a homogeneous melt at the application temperature and having a suitable viscosity at that temperature. This means the use of diluent will allow the formulation to melt at the application temperature, i.e., 400° F. (204° C.) or less, and also possess the desired viscosity of <50,000 cP at that temperature. More particularly, the plasticizing diluent will be an organic material which is non-volatile and compatible with the starch ester and is characterized in containing one or more polar groups, i.e., it is not an all hydrocarbon material. Typically it will have a molecular weight of 5,000 or less. Useful plasticizing diluents containing polar groups include sulfonamides, carboxylic acids and esters, carboxylate salts, amides, phosphate esters, alcohols, i.e. hydroxy containing compounds, epoxides, sulfones, ethers, imides, amines, carbonates, ureas and urethanes. The preferred diluents include those containing sulfonamide, alcohol, amide and ester groups which absorb low levels of moisture at high humidity, i.e., have a moisture content of less than about 20%, preferably less than about 15% by weight, at 90% relative humidity (RH) and 23° C. Particularly preferred diluents are the alcohols or hydroxy containing compounds having this characteristic of low moisture absorption, i.e., hydrophobic alcohols and especially the ethoxylates of phenol and bisphenol A, and N-(2-hydroxyethyl)-12-hydroxy stearamide. The preferred diluents do not include the hydrophilic type alcohols such as glycerin or sorbitol and other compounds of this type which are hygroscopic and easily pick up and absorb moisture. The plasticizing diluent is generally present in amounts of 5 to 50%, preferably 20 to 40% by weight, of the hot melt adhesive.

The adhesive also contains 5 to 40%, preferably 10 to 30% by weight, of a compatible polar wax. Particularly useful are diluents selected from the group consisting of glycerol mono- and distearate, synthetic long chain linear polymeric alcohols, stearic acid, high acid number waxlike materials of mono-or dicarboxylic acids, fatty amide such as the mono-ethanol amide of hydroxy stearic acid, acid wax derived from montan wax, stearyl alcohol, hydrogenated castor oil, ethoxylated alcohols, 12 (OH) stearic acid and stearic-cetyl alcohol.

The adhesive compositions may also include tackifier resins which, if present are used in amounts of 5 to 25% by weight, based on the weight of the composition. The tackifying resins useful in the adhesive compositions are generally polar in nature and have a Ring and Ball softening point (as described by ASTM E-26) of greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example, as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof such, for example, as the resin product resulting from the condensation, in an acidic medium, of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of (e.g., less than about 10% of the adhesive) less compatible resins may be utilized for some formulations.

Optionally, the adhesive composition may also contain up to about 35% of a compatible hydrophilic or hydrophobic thermoplastic polymer. Suitable polymers include hydrophilic polymers such as water-soluble and/or water-swellable polymers and hydrophobic thermoplastic water-insoluble polymers. Such polymers include celluloses such as alkylcelluloses, hydroxyalkylcelluloses, cellulose esters and cellulose salts, polyvinyl alcohols prepared by partial to essentially complete hydrolysis of polyvinyl acetate (preferably 45-80% hydrolyzed), synthetic polymers such as poly(acrylic acids) and their salts and esters, poly (acrylamides), poly (vinyl acetates), poly (vinyl acetate phthlates), poly(vinyl pyrrolidone), poly(crotonic acids), vinylpolymers such as polyvinyl-acetates, polyacrylonitriles, polyvinylcarbazoles, polyacetals, polycondensates such as polyamides, thermoplastic polyesters such as polyhydroxybutyrate/hydroxy-valerate, polylactides (i.e., esters of lactic acid), polyurethanes, poly(alkylene terephthalates), polyarylethers, poly(ethyl oxazoline), poly(ethylene imine), poly(ethylene glycol), thermoplastic polyimides, poly(alkylene oxides) such as polymers of ethylene oxide and propylene oxide, and gelatin.

Particularly useful are polymers containing polar groups such as those described earlier for the diluent with those containing hydroxyl groups being most preferred, especially polyvinyl alcohol, ethylene/vinyl alcohol and hydroxypropyl cellulose.

An antioxidant or stabilizer may also be included in the adhesive compositions described herein in amounts of up to about 3% by weight. Among the applicable antioxidants or stabilizers are high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythritol tetrakis-3(3,5-di-tert-butyl- 4-hydroxyphenyl)-propionate; n-octadecyl-3,5-di-tert-butyl-4- hydroxyphenol)-propionate; 4,4'-methylenebis (2,6-tert-butylphenol); 4,4'thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzyl-phosphonate; 2-(n-octylthio)-ethyl 3,5-di-tert-butyl-4-hydroxybenzoate; and sorbitol hexa[3-(3,5-di-tert-butyl-4-hydroxyphenyl)-propionate].

Other additives conventionally used in hot melt adhesives to satisfy different properties and meet specific application requirements also may be added to the adhesive composition of this invention. Such additives include fillers, pigments, flow modifiers, dyestuffs, etc., which may be incorporated in minor or larger amounts into the adhesive formulation, depending on the purpose.

These hot melt adhesives may be prepared using techniques known in the art. Typically, the adhesive compositions are prepared by blending the components in the melt at a temperature of about 100° to 200° C. until a homogeneous blend is obtained, approximately two hours. Various methods of blending are known and any method that produces a homogeneous blend is satisfactory. In blending the starch with other components of the hot melt composition, it may be desirable to precondition or preswell the starch with the plasticizing diluent (a portion, i.e., 10% or more, or all of the diluent used in the formulation by weight) or water, preferably with both, either at room temperature or slightly elevated temperature (typically $\leq 100°$ C.) and preferably in a sealed container. The added moisture (usually $\leq 35\%$ by weight based on the weight of the starch) promotes swelling of the starch and thus serves as a processing aid. Moisture can be added directly to the starch as liquid water or by conditioning the starch at high humidity. Essentially all of the water is removed by evaporation (to <2% by weight of the final composition) in the final mixing of the adhesive formulation. Preswelling of the starch promotes the rapid formation of a homogeneous melt at reduced temperatures and has been found particularly useful when the starch has a low degree of substitution, such as a DS of less than 2.

The resulting adhesives are characterized in that they have a viscosity of 50,000 cP or less at the application temperature of 400° F. (204° C.) or less. The viscosity as used herein is a Brookfield viscosity measured using a Brookfield viscometer model No. DV-II with spindle no. 27 at 10 rpm.

The following examples illustrate the production of suitable hot melt adhesives as well as the use thereof in a variety of applications. In the examples, all parts are by weight and all temperatures in degree Celsius unless otherwise noted. Test procedures used herein are as follows:

TEST PROCEDURES

Melt Viscosities of the hot melt adhesives/binders were determined on a Brookfield RVT Thermosel viscometer using a number 27 spindle at 20 or 50 rpms.

Delamination—Time to Opening in water for cigarette filter (plug) paper.

Cigarette filter papers were cut into 2 inch lengths and 1 inch widths. The hot melt adhesives to be tested were heated to 350° F. and 1 mil thin beads were made on filter paper. A bond was formed between two papers by applying a 200 gm weight.

The samples were immersed in cold tap water in a beaker using a metallic hook and stirred. The time of opening in water was determined.

Tack Range—The hot melt adhesive was heated to about 350° F. and a film was drawn down on a pad with a glass rod. Tack testing began by taking finger off and on film, counting, to also determine the relative range of hot melt. (This test extremely subjective. Products are rated only by comparison.)

Peel and Shear Test Procedure—Bonds are prepared using a standard kraft paper cut to a size of 3 inches by 1 inch.

The hot melt adhesive is heated to 350° F. and a thin bead applied down the middle of the substrate. Immediately after bead application, a second piece of kraft is placed directly over the first and the bead compressed using a 200 gm weight. The compressed bead should be approximately ½ inch wide.

Six bonds are prepared for each sample —3 peel and 3 shear bonds.

After overnight aging the bonds are then placed in an oven at 100° F. in the peel and shear configurations using 100 gm weights.

The temperature of the oven is raised 10° F. every 15 minutes. The temperatures at which the bonds fail are noted and these are the peel and shear values.

Ring and Ball Softening Point is measured in glycerine bath using the procedures described in ASTM E28-58T.

EXAMPLE I

A useful starch based hot melt adhesive was prepared by the following method.

Starch propionate ester having a degree of substitution of 0.94 (Hylon VII from National Starch and Chemical Company), ethyloxylated Bisphenol A (Macol 206 E from PPG), and the antioxidants were added to a (130° C.) preheated sigma blade mixer and blended until smooth. The terpene/phenolic tackifier (Nirex 2150 from Arizona) was added and the mixture again blended until smooth. The wax component (Paracin 220 from CasChem) was then added and mixed until fully incorporated. In the case of batches A, B and C, the temperature was raised from 135° C. to 145° C. in order to fully incorporate the tackifier.

TABLE I

| MATERIALS | A | B | C | D |
|---|---|---|---|---|
| Starch Propionate | 47.5 | 47.5 | 47.5 | 47.5 |
| Macol 206E | 32.5 | 30 | 32.5 | 35 |

TABLE I-continued

| MATERIALS | A | B | C | D |
|---|---|---|---|---|
| Paricin 220 | 12.5 | 15 | 15 | 17.5 |
| Nirex 2150 | 7.5 | 7.5 | 5 | — |
| Santovar A (Monsanto) | 0.5 | 0.5 | 0.5 | 0.5 |
| Weston TNPP (Weston) | 0.5 | 0.5 | 0.5 | 0.5 |

The resulting adhesives were then tested for the desired performance properties using the procedures described previously. The results are shown in Table II.

TABLE II

| MATERIALS | A | B | C | D |
|---|---|---|---|---|
| VISCOSITY | | | | |
| @ 275° F. | 1840 | 1865 | 1500 | 1290 |
| @ 300° F. | 1400 | 1400 | 1090 | 1015 |
| PEEL/°F. | 140° F. | 150° F. | 130° F. | 110° F. |
| SHEAR/°F. | 170° F. | 190° F. | 180° F. | 190° F. |
| ADHESION TO CIGARETTE PAPER AND TIME TO OPENING IN WATER | 10 Min. | 20 Min. | 15 Min. | 1–2 Sec. |
| TACK RANGE | 1–2 Sec. | 1–2 Sec. | 1–2 Sec. | 1–2 Sec. |
| RING & BALL SOFTENING POINT | 187° F. | 194° F. | 191° F. | 184° F. |

EXAMPLE II

Additional formulations were prepared and tested as in Example I. The compositions and results are shown in Tables III and IV. In this testing, the results were also compared with a conventional cigarette plug adhesive based on 25 parts ethylene vinyl acetate copolymer containing 28% vinyl acetate, 30 parts Kristalex, methyl styrene tackifier and 45 parts Paraflint Wax.

TABLE III

| MATERIALS | E | F |
|---|---|---|
| STARCH | 40 | 37 |
| MACOL 206E | 35 | 35 |
| PARACIN 220 | 10 | 13 |
| NIREZ 300 | 15 | 15 |

TABLE IV

| MATERIALS | E | F | CONTROL |
|---|---|---|---|
| VISCOSITY (cps) | | | 770 |
| @ 275° F. | 1485 | 580 | |
| @ 300° F. | 990 | | 2000 |
| @ 325° F. | | | 1500 |
| @ 350° F. | | | 1000 |
| PEEL/°F. | 120° F. | 120° F. | 140° F. |
| SHEAR/°F. | 160° F. | 170° F. | 190° F. |
| ADHESION TO CIGARETTE PAPER AND TIME TO OPENING IN WATER | 15 Min. | 10 Min. | ∞ |
| TACK RANGE | 4–5 Sec. | 3–4 Sec. | 1–2 Sec. |
| RING & BALL SOFTENING POINT | 192° F. | 194° F. | 224° F. |

The results presented in Tables II and IV clearly illustrate the desirable performance of the starch based adhesives for cigarette filter applications. Moreover, these adhesives, while sufficiently polar in nature to be water sensitive and release when exposed to water provide, nonetheless sufficient fast-setting as well as acceptable taste and odor properties to be used in commercial cigarette filter applications. In addition, these materials may also be biodegradable.

In summary, the results show that these hot melt adhesives may be successfully used to form cigarette filters as described hereinabove. It will be apparent that various changes and modifications may be made in the embodiments of the invention described above, without departing from the scope of the invention, as defined in the appended claims, and it is intended therefore, that all matter contained in the foregoing description shall be interpreted as illustrative only and not limitative of the invention.

We claim:

1. In a process for manufacturing degradable cigarette filters wherein bloomed tow in the form of a tube and containing triacetin is wrapped in plug wrap paper, adhesive is applied to at least one longitudinal edge of the plug wrap paper, a bond is made while the adhesive is molten and the resultant bond is held in compression for sufficient time to prevent bond movement, the improvement which comprises, using as the adhesive, a water sensitive hot melt adhesive comprising 20 to 60% by weight of an intermediate or high DS starch ester having from about 2 to 18 carbon atoms in the ester component and a DS (degree of substitution) of from about 0.3 to 2.5, 5 to 40% by weight of a polar wax, 5 to 50% by weight of a plasticizing diluent, 0 to 25% by weight of a comptabile tackifier and 0 to 3% by weight of an antioxidant; characterized in that the resulting cigarette filter will open when exposed to water.

2. The process of claim 1 wherein the starch ester in the adhesive has a DS of 0.7 to 2.4.

3. The process of claim 2 wherein the starch ester in the adhesive contains 2 to 7 carbon atoms in the ester component.

4. The process of claim 1 wherein the starch ester in the adhesive has the formula:

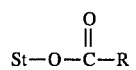

where St is the starch base material and R is an alkyl, aryl, alkenyl, alkaryl or aralkyl containing 1 to 17 carbon atoms.

5. The process of claim 1 wherein the tackifying resin in the adhesive is selected from the group consisting of natural and modified rosin, glycerol and pentaerythritol esters of natural and modified rosin, phenolic modified coumarone indene resins, cioumarone indene resins with softening points of about 5° to 117° C. and phenolic modified terpene resins.

6. The process of claim 1 wherein the polar wax in the adhesive is selected from the group consisting of glycerol mono- and distearate, synthetic long chain linear polymeric alcohols, stearic acid, high acid number mono- or dicarboxylic acids, fatty amides, stearyl alcohol, hydrogenated castor oil, ethyoxylated alcohols, 12 (OH) stearic acid and stearic-cetyl alcohol.

7. The process of claim 1 wherein the tow is formed from filaments selected from the group consisting of cellulose acetate, poly(ethylene terephthalate), propylene and polyethylene.

8. The process of claim 1 wherein the tow comprises a biodegradable filter material.

9. The process of claim 1 wherein the starch in the adhesive is a propionate ester of high amylose and the plasticizing diluent is an ethoxylate of bisphenol A.

* * * * *